(12) United States Patent
Pellini et al.

(10) Patent No.: US 11,699,183 B2
(45) Date of Patent: Jul. 11, 2023

(54) CRYPTOCURRENCY MINING SELECTION SYSTEM AND METHOD

(71) Applicant: WT Data Mining and Science Corp., Lockland, OH (US)

(72) Inventors: Rudá Farias Formolo Pellini, Florianopolis (BR); Regis Adair Vargas Cardoso, Florianopolis (BR); Felipe Eduardo Rosa, Florianopolis (BR); Igor Alexandre Clemente De Morais, Porto Alegre (BR); Cleverton Carlos Ribeiro, Santa Cruz do Sul (BR)

(73) Assignee: WT Data Mining and Science Corp., Lockland, OH (US)

( * ) Notice: Subject to any disclaimer, the term of this patent is extended or adjusted under 35 U.S.C. 154(b) by 0 days.

(21) Appl. No.: 16/547,240

(22) Filed: Aug. 21, 2019

(65) Prior Publication Data

US 2020/0342531 A1    Oct. 29, 2020

Related U.S. Application Data

(60) Provisional application No. 62/720,342, filed on Aug. 21, 2018.

(51) Int. Cl.
*G06Q 40/04* (2012.01)
*G06N 20/00* (2019.01)
(Continued)

(52) U.S. Cl.
CPC ......... *G06Q 40/04* (2013.01); *G06F 16/2315* (2019.01); *G06N 20/00* (2019.01);
(Continued)

(58) Field of Classification Search
CPC .... G06Q 40/04; G06Q 10/04; G06Q 20/0655; G06Q 20/3672; G06Q 2220/00;
(Continued)

(56) References Cited

U.S. PATENT DOCUMENTS

| | | | |
|---|---|---|---|
| 2014/0201057 A1* | 7/2014 | Shuster | G06Q 40/04 705/37 |
| 2016/0110657 A1* | 4/2016 | Gibiansky | G06N 20/00 706/12 |
| 2018/0225611 A1* | 8/2018 | Daniel | G06F 16/27 |

OTHER PUBLICATIONS

Raykar, V.C., Yu, S., Zhao, L.H., Valadez, G.H., Florin, C., Bogoni, L. and Moy, L., 2010. Learning from crowds. Journal of machine learning research, 11(4). (Year: 2010).*

(Continued)

*Primary Examiner* — Eric T Wong
*Assistant Examiner* — John O Preston
(74) *Attorney, Agent, or Firm* — Ulmer & Berne LLP

(57) ABSTRACT

A system and method of optimizing cryptographic mining yields includes analyzing, by a cryptocurrency mining selection system, data associated with factors of interest for one or more cryptocurrencies using machine learning algorithms. Data that is determined to be predictive of the future value of newly mined tokens is used to determine which tokens will have the highest and lowest future values. Based on the predicted value of tokens in the future and the current value of those tokens for each cryptocurrency, the system outputs one or more instructions to buy tokens in cryptocurrencies predicted to increase in value, to sell tokens in cryptocurrencies predicted to decrease in value, and to instruct associated cryptocurrency mining hardware to switch to generating new tokens in one or more selected cryptocurrencies to maximize yields.

1 Claim, 3 Drawing Sheets

(51) Int. Cl.
G06F 16/23 (2019.01)
G06Q 10/04 (2023.01)
G06Q 20/06 (2012.01)
G06Q 20/36 (2012.01)

(52) U.S. Cl.
CPC ......... *G06Q 10/04* (2013.01); *G06Q 20/0655* (2013.01); *G06Q 20/3672* (2013.01); *G06Q 2220/00* (2013.01)

(58) Field of Classification Search
CPC .... G06Q 20/02; G06Q 20/065; G06Q 20/223; G06Q 20/3825; G06Q 20/3827; G06Q 40/06; G06N 20/00; G06F 16/2315; H04L 9/50; H04L 2209/56
USPC .......................................................... 705/37
See application file for complete search history.

(56) References Cited

OTHER PUBLICATIONS

Bellavista, Paolo, et al. "An edge-based distributed ledger architecture for supporting decentralized incentives in mobile crowdsensing." 2020 20th IEEE/ACM International Symposium on Cluster, Cloud and Internet Computing (CCGRID). IEEE, 2020. (Year: 2020).*

Blemus, S. and Guégan, D., 2020. Initial crypto-asset offerings (ICOs), tokenization and corporate governance. Capital Markets Law Journal, 15(2), pp. 191-223. (Year: 2020).*

* cited by examiner

CRYPTOCURRENCY MINING SELECTION SYSTEM AND METHOD

CROSS-REFERENCE TO RELATED APPLICATIONS

This application claims the benefit of U.S. Provisional No. 62/720,342, filed Aug. 21, 2018, which is herein incorporated by reference in its entirety.

TECHNICAL FIELD

Embodiments of the technology relate, in general, to optimization algorithms and technology, and in particular to systems and method for optimized cryptocurrency mining (from hardware portfolio Selection to mining profit taking system), cryptocurrency staking, portfolio optimization with traditional and crypto assets, and a cryptocurrency trading system platform.

BACKGROUND

Cryptocurrency mining typically involves using specialized hardware designed to execute complex hashing algorithms to find and validate hashes which become currency in a particular cryptocurrency network, such as BITCOIN. Cryptographic hashes are stored in blocks using a distributed ledger technology (DLT) or blockchain that is shared and synchronized between multiple computer systems. The sharing and synchronization of the blockchain allows the growing list of records to be resistant to unauthorized changes.

The specialized hardware used in cryptocurrency mining can involve a large number of high end graphics cards or customized processors configured to process massive numbers of calculations in parallel to find tokens. Depending on the current value of a selected cryptocurrency, it may become uneconomical to mine for tokens in certain cryptocurrencies given the cost of the hardware, the cost of electricity to power and cool the hardware, and the amount of time it takes to successfully find valid tokens, while other cryptocurrencies may become more economical given similar factors.

BRIEF DESCRIPTION OF THE DRAWINGS

Various embodiments will become better understood with regard to the following description, appended claims and accompanying drawings wherein:

DETAILED DESCRIPTION

Figure 1:
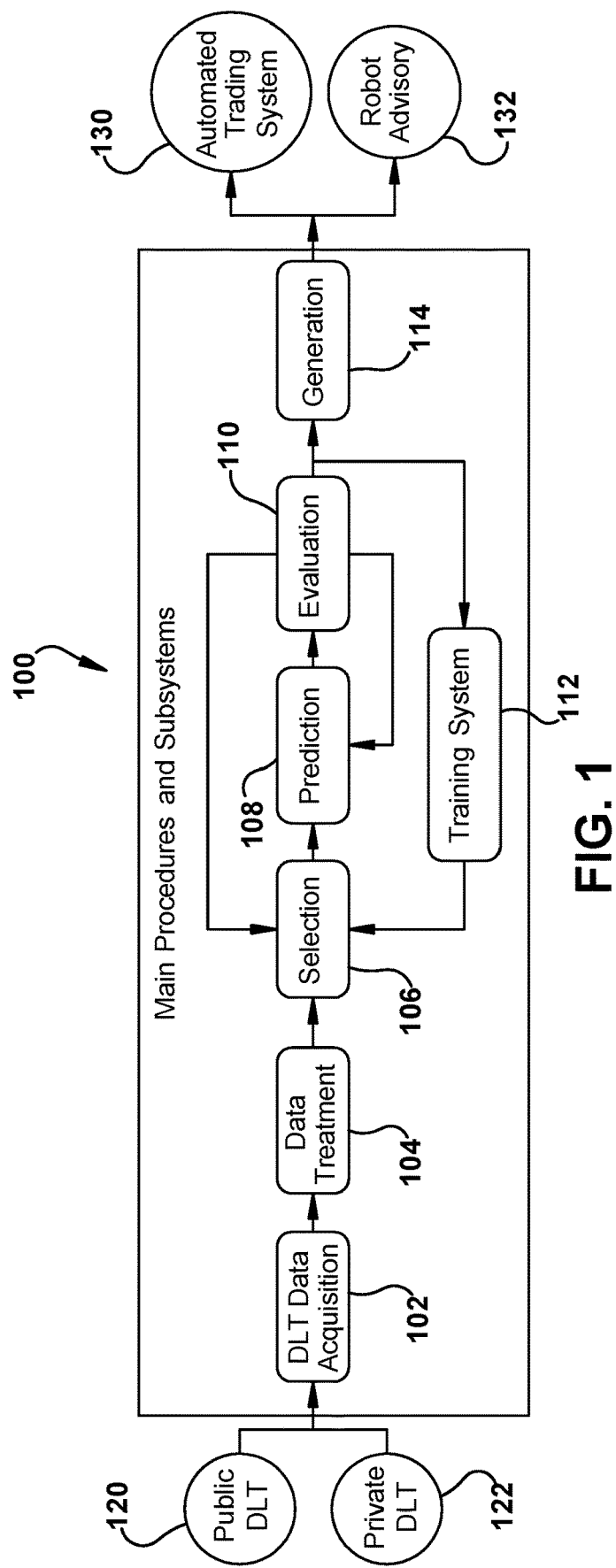
FIG. 1 is a diagram of an example embodiment of a cryptocurrency mining selection system.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Various non-limiting embodiments of the present disclosure will now be described to provide an overall understanding of the principles of the structure, function, and operations of a cryptocurrency mining system. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Described herein are example embodiments of computer-based systems and methods for determining optimized cryptocurrency solutions. In various embodiments, algorithms can be used to determine which cryptocurrencies are yielding the greatest profit from mining. In various embodiments, a system can automatically transition from one cryptocurrency to another cryptocurrency based upon various economic factors. Embodiments of the system described herein can optimize cryptocurrency mining by focusing on mining coins or tokens to generate the highest yield or profit. For example, one cryptocurrency may have a reduced yield based upon demand, the number of miners, or other conditions, where switching to mining a different cryptocurrency may be advantageous. In various embodiments, a single miner or bank of miners can be used to mine one or a plurality of different cryptocurrencies depending on various economic factors.

Embodiments of a cryptocurrency mining optimized computer system can run on any suitable computing system, such as a dedicated server, a user computer or server, multiple computers, a collection of networked computers, a cloud-based computer system, a web-based computer system, or from a storage device, for example. One or multiple processing units, such as central processing units and/or graphics processing units, may perform instructions stored in memory to execute the processes described herein.

Embodiments of a cryptocurrency mining optimized computer system in accordance with the present disclosure can be accessed via any suitable technique, such as a web-browser such as SAFARI, OPERA, GOOGLE CHROME, INTERNET EXPLORER, or the like executing on a client device. In some embodiments, the systems and methods described herein can be a web-based application or a stand-alone executable. Additionally, in some embodiments, the systems and methods described herein can integrate with various types of cryptocurrency exchange systems, such as COINBASE, and the like.

Any suitable client device can be used to access, or execute, the cryptocurrency mining optimized computing system, such as laptop computers, desktop computers, smart phones, tablet computers, gaming system, and the like. User interaction with the cryptocurrency mining optimized computer system may take place in any of a variety of operational environments, such as a work setting or a home setting, with one or more users interacting with the system at a given time. Users can receive real-time feedback, or near real-time feedback, and can synchronize with one or more crypto exchange computer systems.

In accordance with the subject application, FIG. 1 illustrates an example embodiment of a cryptocurrency mining selection system 100. The system 100 includes a data acquisition subsystem 102, a data treatment subsystem 104, a selection subsystem 106, a prediction subsystem 108, an evaluation subsystem 110, a training subsystem 112, and a generation sub system 114.

The data acquisition subsystem 102 can acquire data from distributed ledger technology (DLT), or blockchains, including data public DLTs 120 and private DLTs 122. DLTs 120, 122 can provide information such as the degree of difficulty or cost to generate a token, hashrate, the number of active wallets and so forth. The data treatment subsystem 104 can take raw data and extract useful data that is converted into a suitable format for use in the selection subsystem 106.

The selection subsystem 106 can determine which of the acquired data is useful for determining the value of mining one or more cryptocurrencies. The selection subsystem 106 can receive input and process factors from markets or exchanges (cryptocurrencies, FIAT, economic and financial indicators, and the like), crowd, and network data among other suitable factors. The prediction subsystem 108 can determine a predicted value of one or more cryptocurrencies. The evaluation subsystem 110 can evaluate the current value of mining one or more cryptocurrencies. The evaluation subsystem 110 can periodically evaluate the performance of the investment portfolio, rebalancing it whenever necessary to correct performance degradations in different time horizons. The training subsystem 112 can generate models for weighting factors used to select which cryptocurrencies are selected for mining by the system 100. The generation subsystem 114 can output indicia related to the current and predicted value of cryptocurrencies, for example indicia related to the highest value token. The outputs can be directed to automated trading systems 130 such as advice or instructions for buying or selling cryptocurrencies, and a robot advisory system 132 that directs cryptocurrency mining hardware to mine one or several cryptocurrencies.

The system 100 can include processors executing algorithms such as neural networks, deep learning, machine learning and/or statistical analysis, to model, track the performance of a given cryptocurrency market, output a forecast for a given token, and manage a portfolio of cryptocurrencies. Each model can be trained using specific inputs, known here as factors, and any kind of information as algorithm optimization, hyperparameters, loss function, likelihood, number of layers and the like, and can be applied to supervised or unsupervised problems.

Figure 2:
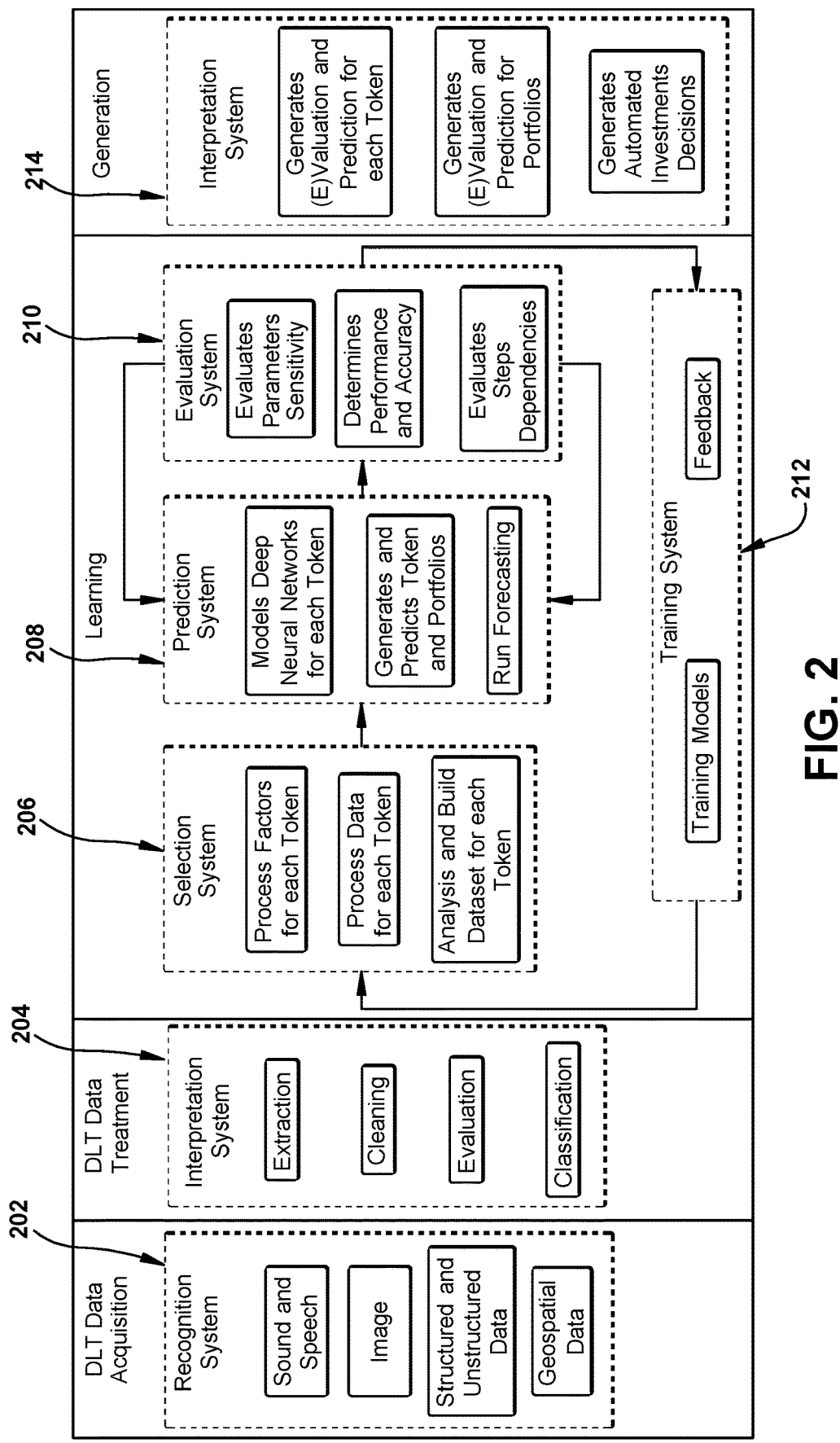
FIG. 2 is a diagram of example embodiments of subsystems of a cryptocurrency mining selection system.

Referring to FIG. 2, an example embodiment of subsystems of a cryptocurrency mining selection system 200 is presented. The system 200 includes the following subsystems:

A Recognition Subsystem 202 that allows users to identify different ways of describing data; can be used to recognize voices, faces, images, movements and color details making use of structured, unstructured and geospatial data.

An Interpretation Subsystem 204 that extracts information from any suitable source, in different formats, allowing raw data to be compared and used in evaluation processes.

A Selection Subsystem 206 that filters data for a specific period of time, tokens, analysis, and portfolios; establishes a specific dataset to provide inputs of data to further procedures and subsystems.

A Prediction Subsystem 208 that applies modeling techniques to identify the patterns of a set of data; involves the use of univariate and multivariate time series models, statistical learning, and deep neural networks.

An Evaluation Subsystem 210 that validates the prediction model, making use of sensitivity analysis of the parameters used in the model, comparative accuracy and performance measurement techniques and feedback of the estimates.

A Training Subsystem 212 that generates sufficient information to validate the model used; can be performed periodically from the cycle of new training and re-estimation dataset.

An Interpretation Subsystem 214 that outputs model forecasts that can be used for investment decision making, critical analysis, and opinion formation for multiple scenarios.

Figure 3:
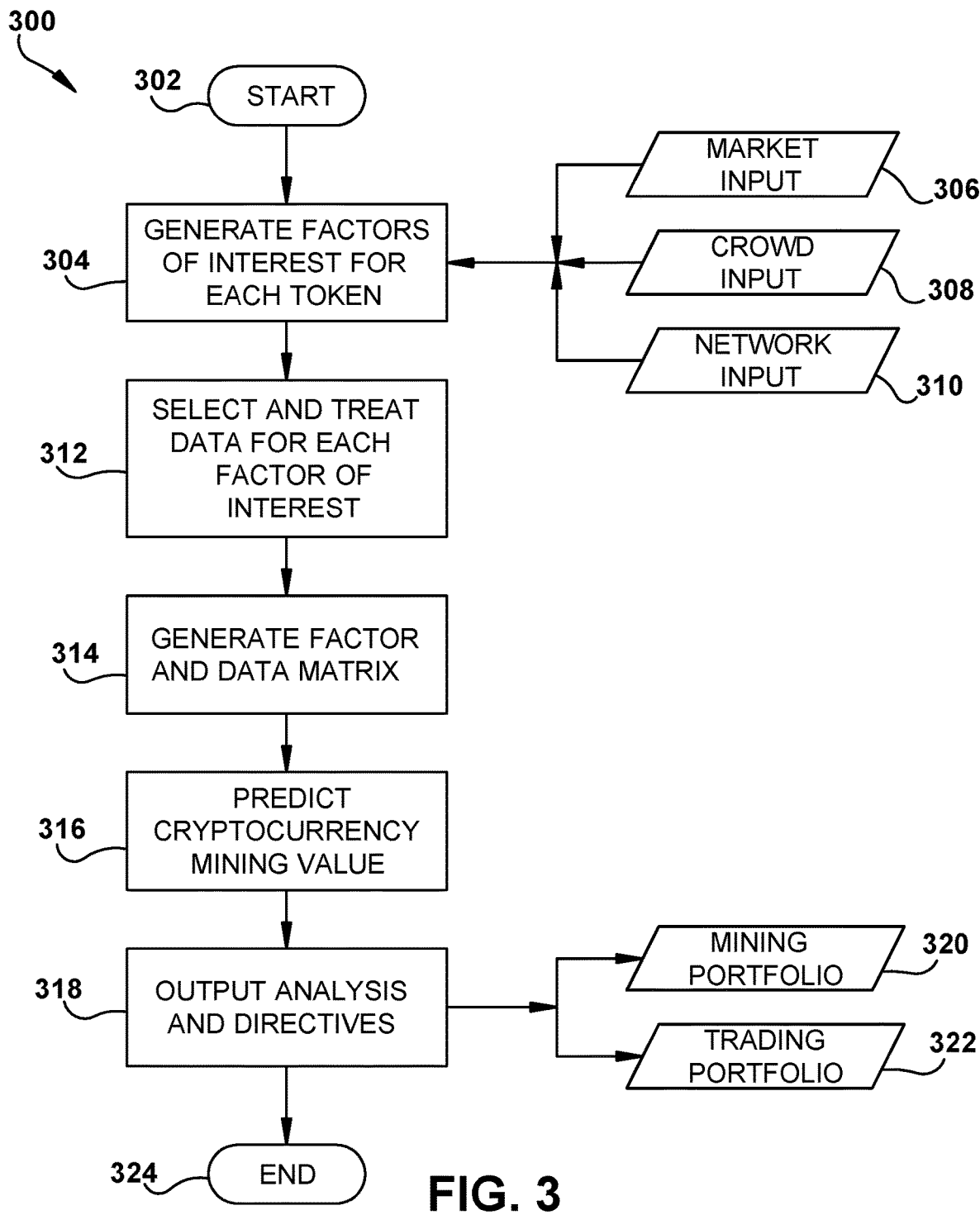
FIG. 3 is a flowchart of example operations of an embodiment of a cryptocurrency mining selection system.

Referring to FIG. 3, a flowchart of example operations 300 of an embodiment of a cryptocurrency mining selection system is presented. Processing starts at block 302 and proceeds to block 304. At block 304, factors of interest are generated for each type of cryptocurrency token. Factors of interest can include primary sources of information such as market input 306, crowd input 308, and network input 310. Market input 306 can include the set of all the data available for public/private consultation, for example but not limited to, the information of price, volume, book value among others of the stock market, exchange, interest and futures around the world, economic data such as sentiment indexes, currency issuance, and inflation among other indexes, or consumer sentiment information. Crowd input 308 can represent variables that are considered structured and unstructured and involve, for example but are not limited to, information from social networks, websites, videos, news vehicles and all others in text, voice, video, images. Network input 310 can represent information that involves DLT technology and that can help understand the value associated with the cryptocurrencies such as data related to the blockchain model used, degree of difficulty or cost to generate the token, consensus form and so on can be used. Processing continues to block 312.

At block 312, data associated with each factor of interest for each token is selected and treated. The choice of factors associated with each token can include but is not limited to, crowd sentiment, network difficulty, network hashrate, main pools, number of active wallet addresses, correlation between token and stock market, analyzed and indexed, criticized and filtered in relation to the period of analysis, correlation and several other analysis statistics. Processing continues to block 314.

At block 314, an information matrix is generated that represents both the factors associated with each token, the data associated with each factor, and the relation between them. Processing continues to block 316.

At block 316, the information matrix can be then modelled using techniques such as deep neural network and other learning algorithms, such as described above, to generate predictions and cryptocurrency mining valuations. Processing configured to block 318.

At block 318, the system outputs directives and analysis for cryptocurrency mining 320 and portfolio trading and management 322. For example, a directive can include an instruction to buy or sell assets associated with a cryptocurrency which can include trading the tokens. Analysis can include instructions or guidance to third parties about various cryptocurrencies. Processing ends at block 324.

In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, using, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

It can also be appreciated that certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, or hard disk drives. A computer-readable medium can also include memory storage that is physical, virtual, permanent, temporary, semi-permanent, and/or semi-temporary.

A "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein can include memory for storing certain software modules used in obtaining, processing, and communicating information. It can be appreciated that such memory can be internal or external with respect to operation of the disclosed embodiments. The memory can also include any means for storing software, including a hard disk, an optical disk, floppy disk, ROM (read only memory), RAM (random access memory), PROM (programmable ROM), EEPROM (electrically erasable PROM) and/or other computer-readable media. Non-transitory computer-readable media, as used herein, comprises all computer-readable media except for a transitory, propagating signal.

In various embodiments disclosed herein, a single component can be replaced by multiple components and multiple components can be replaced by a single component to perform a given function or functions. Except where such substitution would not be operative, such substitution is within the intended scope of the embodiments. The computer systems can comprise one or more processors in communication with memory (e.g., RAM or ROM) via one or more data buses. The data buses can carry electrical signals between the processor(s) and the memory. The processor and the memory can comprise electrical circuits that conduct electrical current. Charge states of various components of the circuits, such as solid state transistors of the processor(s) and/or memory circuit(s), can change during operation of the circuits.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

What is claimed is:

1. A token mining selection system, comprising a server, wherein the server comprises a processor and a memory, and a plurality of mining devices, wherein each of the plurality of mining devices is configured to perform token mining activities;

wherein the processor is configured to:
(a) store a token dataset that describes one or more mineable tokens;
(b) receive a market input dataset from one or more market data sources, and determine a set of market characteristics for each of the one or more mineable tokens based on the market input dataset, wherein the set of market characteristics includes at least a value;
(c) receive a crowd input dataset from one or more crowd data sources, and determine a set of crowd characteristics for each of the one or more mineable tokens based on the crowd input dataset, wherein the set of crowd characteristics includes at least a sentiment;
(d) monitor one or more distributed ledgers and produce a distributed ledger dataset, wherein the one or more distributed ledgers include at least one public distributed ledger, and at least one private distributed ledger;
(e) determine a set of mining characteristics for each of the one or more mineable tokens based on the distributed ledger dataset, wherein the set of mining characteristics includes at least a degree of difficulty, a hashrate, and a number of wallets;
(f) create a predictive model for the one or more mineable tokens based on the set of market characteristics, the set of crowd characteristics, and the set of mining characteristics for each, wherein the processor is configured to, when creating the predictive model:
  (A) generate an information matrix that describes a plurality of relationships between the set of market characteristics, the set of crowd characteristics, and the set of mining characteristics;
  (B) create the predictive model using a deep neural network and based on the information matrix;
  (C) periodically validate the predictive model based on sensitivity analysis of parameters used by the predictive model, and accuracy of the predictive model; and
  (D) based upon the periodic validation, periodically perform new training of the predictive model; and
(g) provide an instruction the plurality of mining devices based on analysis by the predictive model of the one or more mineable tokens, wherein the instruction is associated with a selected mineable token of the one or more mineable tokens, and
wherein the plurality of mining devices are configured to, in response to the instruction, perform token mining activities on a distributed ledger associated with the selected mineable token.

\* \* \* \* \*